United States Patent
Dollase et al.

(10) Patent No.: US 10,232,586 B2
(45) Date of Patent: Mar. 19, 2019

(54) PRESSURE-SENSITIVE ADHESIVE TAPES FOR THE ADHESIVE BONDING OF WINDOWS MORE PARTICULARLY IN MOBILE EQUIPMENT

(71) Applicant: TESA SE, Norderstedt (DE)

(72) Inventors: Thilo Dollase, Hamburg (DE); Anika Petersen, Bimöhlen (DE); Elisabetta Ardente, Hamburg (DE); Franziska Eberhardt, Hamburg (DE); Stephan Zöllner, Buchholz/Nordheide (DE); Kai Ellringmann, Hamburg (DE); Bernd Lühmann, Norderstedt (DE)

(73) Assignee: TESA SE, Norderstedt (DE)

( * ) Notice: Subject to any disclaimer, the term of this patent is extended or adjusted under 35 U.S.C. 154(b) by 161 days.

(21) Appl. No.: 14/906,106

(22) PCT Filed: Jul. 8, 2014

(86) PCT No.: PCT/EP2014/064647
§ 371 (c)(1),
(2) Date: Jan. 19, 2016

(87) PCT Pub. No.: WO2015/014582
PCT Pub. Date: Feb. 5, 2015

(65) Prior Publication Data
US 2016/0167339 A1    Jun. 16, 2016

(30) Foreign Application Priority Data

Aug. 2, 2013 (DE) .................. 10 2013 215 298

(51) Int. Cl.
| G02B 1/04 | (2006.01) |
| C08L 25/10 | (2006.01) |
| C08L 55/02 | (2006.01) |
| B32B 7/12 | (2006.01) |
| C09J 133/08 | (2006.01) |
| C09J 5/00 | (2006.01) |
| H04M 1/02 | (2006.01) |

(52) U.S. Cl.
CPC ............... *B32B 7/12* (2013.01); *C08L 25/10* (2013.01); *C09J 5/00* (2013.01); *C09J 133/08* (2013.01); *G02B 1/04* (2013.01); *B32B 2250/02* (2013.01); *B32B 2307/412* (2013.01); *B32B 2307/414* (2013.01); *B32B 2457/20* (2013.01); *C09J 2205/10* (2013.01); *C09J 2421/00* (2013.01); *C09J 2433/00* (2013.01); *H04M 1/0266* (2013.01)

(58) Field of Classification Search
None
See application file for complete search history.

(56) References Cited

U.S. PATENT DOCUMENTS

| 6,503,621 B1 | 1/2003 | Ma et al. |
| 6,632,522 B1 * | 10/2003 | Hyde .................. A61L 15/585 427/208.4 |
| 2010/0113674 A1 | 5/2010 | Strand |
| 2013/0295356 A1 | 11/2013 | Husemann et al. |
| 2015/0232713 A1 | 8/2015 | Koft et al. |

FOREIGN PATENT DOCUMENTS

| DE | 10 2010 001 386 A1 | 8/2011 |
| DE | 10 2013 000 995 A1 | 2/2014 |
| EP | 0 349 216 A1 | 1/1990 |
| EP | 0 437 068 B1 | 7/1991 |
| EP | 0 352 901 B1 | 8/1995 |
| EP | 2 397 503 A1 | 12/2011 |
| JP | H 11501956 A | 2/1999 |
| JP | H 10152662 A | 6/1999 |
| JP | 2000-502919 A | 3/2000 |
| JP | 2000-191987 A | 7/2000 |
| JP | 2009-62543 A | 3/2009 |
| JP | 2012-512296 A | 5/2012 |
| JP | 2014-533757 A | 12/2014 |
| WO | 2000/006637 A1 | 2/2000 |
| WO | 2012/062589 A2 | 5/2012 |
| WO | 2013/074446 A1 | 5/2013 |

OTHER PUBLICATIONS

German Search Report dated May 23, 2014.
International Search Report dated Oct. 15, 2014, mailed Oct. 22, 2014.
English Translation of International Search Report dated Oct. 15, 2014, mailed Oct. 22, 2014.
English Translation of Taiwanese Office Action dated Mar. 6, 2018 for corresponding Taiwanese application No. 103126199.
English Translation of Japanese Office Action dated May 8, 2018 for corresponding Japanese application No. 2016-530409.
English translation of Office Action dated Dec. 12, 2018, in connection with Japanese Patent Application No. 2016-530409.

* cited by examiner

*Primary Examiner* — Sheeba Ahmed
(74) *Attorney, Agent, or Firm* — Norris McLaughlin, P.A.

(57) ABSTRACT

Composite made of two substrates for use for optical, electronic and/or precision-engineered equipment, comprising a first substrate and a second substrate and, arranged so as to connect the first substrate to the second substrate, an adhesive layer, wherein the adhesive layer comprises an adhesive which has, relative to the mixture, (a) from 60% by weight to 90% by weight of a first polymer component based on polyacrylate and (b) from 10% by weight to 40% by weight of a second polymer component based on elastomers, where the second polymer component is essentially not miscible with the first polymer component, so that the adhesive is present in at least two separate phases in the adhesive layer.

16 Claims, 2 Drawing Sheets

PRESSURE-SENSITIVE ADHESIVE TAPES FOR THE ADHESIVE BONDING OF WINDOWS MORE PARTICULARLY IN MOBILE EQUIPMENT

This is a 371 of PCT/EP2014/064647 filed 8 Jul. 2014, which claims foreign priority benefit under 35 U.S.C. 119 of German Patent Application 10 2013 215 298.1 filed Aug. 2, 2013, the entire contents of which are incorporated herein by reference.

The invention relates to a composite of two substrates, in particular for use for optical, electronic and/or precision mechanical devices, comprising a first substrate and a second substrate and an adhesive layer arranged to join the first substrate to the second substrate. The invention relates further to the use of adhesives in the production of such devices.

BACKGROUND OF THE INVENTION

Almost all devices of modern entertainment electronics have visual display systems for displaying the operating state of the device or further information. If more complex relationships are to be represented, display modules based on liquid crystals (LCD) or on organic light-emitting diodes (OLED) are frequently used for the display. Such displays are used, for example, in digital cameras, portable minicomputers and mobile telephones.

In order to protect the display modules from possible damage through external mechanical action, such as, for example, shocks, such display systems conventionally have transparent protective windows which cover the outside of the display modules and thus reduce the risk of direct action on the module. Such protection is likewise necessary in the case of non-electronic visual display systems, for example in the case of mechanical displays such as, for example, timepieces or level indicators on storage vessels.

Polymer sheets (for example of polycarbonate (PC), polymethyl methacrylate (PMMA)) or glass sheets are conventionally used as the protective windows, wherein each of the two systems has advantages and disadvantages and is therefore to be chosen according to the specific application.

Although polymer sheets are inexpensive as well as easy to process and provide efficient protection from mechanical actions, they have the disadvantage that they are not usually scratch-resistant and therefore are easily damaged. This not only leads to an impairment of the esthetic impression of the display systems after only a short time but also results in a diminished view of the display region of the display modules. In addition, many common polymers have only limited resistance to ultraviolet light (UV light) or organic solvents.

Protective windows of glass, on the other hand, are inert towards organic solvents and, because of their high hardness, are also scratch-resistant, so that they impart a high-quality impression. However, because of the brittleness of this material, resulting from its hardness, glass has only limited suitability as protection against mechanical actions such as shock or impact because splintering brittle fracture of the glass sheet can occur even at low stresses. In addition to the only limited protective action, there is accordingly also the risk of injury due to the resulting splinters as well as the risk of damage to the display module by sharp-edged fragments.

Sheets of glass or other transparent or translucent materials are also used when optical functions, such as light refraction, focusing, attenuation or amplification, are to be performed. When such lenses are fitted into the mount, or the device body, the requirements are similar to those of the above-described windows. The problems are therefore comparable.

The fixing of protective display windows or optical lenses in the casings of electronic devices, in particular small portable devices such as mobile telephones and the like, which casings are conventionally made of plastics material or metal, is today carried out mainly by means of double-sided adhesive tapes. The person skilled in the art is therefore interested in suitable and ever better adhesives for double-sided adhesive tapes for the adhesive bonding of such cover glasses or lenses to mounts or casings. The profile of requirements for adhesives for such applications includes high push-out strength (that is to say the bond strength of the component in its mount) and, at the same time, high impact strength even at low temperatures. In addition, a high adhesive power even on non-polar substrates is frequently required, for example for better adhesive bonding to printed substrates; printed layers, for example, can thus have a low-energy surface. A certain "reworkability" even for permanently bonded substrates is additionally advantageous, that is to say the device can be disassembled within a short period of time after assembly or even after a prolonged time in such a manner that individual components can be recovered in a residue- and damage-free manner. High heat resistance is likewise frequently desirable.

EP 349 216 A1 describes that styrene block copolymers (SBC) can be added to polyacrylate pressure sensitive adhesives, which are produced in the form of a so-called UV syrup, in order to improve the low-temperature impact strength. Typical added amounts of the SBC are 5 parts to 35 parts for 95 parts to 65 parts of the acrylate component. An application as described in the introductory part of this specification, in particular taking into consideration the specific balance of requirements of push-out strength and ball-drop resistance, is not disclosed.

EP 352 901 B1 relates to pressure sensitive adhesives comprising from 65 to 95 parts of a UV-polymerized polyacrylate and from 35 to 5 parts of a synthetic rubber; EP 437 068 B1 discloses cellular pressure sensitive adhesive membranes based on polyacrylate/SBC blends. Improved low-temperature impact strength and adhesion to paints is discussed. These specifications are not directed to the application discussed herein.

WO 2000/006637 A1 teaches foamed adhesive layers. Blends consisting of acrylates and SBC are mentioned, but likewise for different fields of application.

WO 2012/062589 teaches examples of similar adhesive bonding applications as in the present specification, but without mentioning corresponding adhesives.

Adhesives that are suitable in particular for the adhesive bonding of windows or lenses in mounts or casings are therefore sought. A balanced combination of high push-out strength and impact strength even at low temperatures is desired. High adhesive powers on substrates of low polarity, good reworkability and heat resistance are advantageous.

SUMMARY OF THE INVENTION

Without it being foreseeable, the object is achieved by an adhesive comprising at least the following two components:
  a first, polyacrylate-based polymer component (called the polyacrylate component hereinbelow) in an amount of from 60% by weight to 90% by weight, preferably from 65% by weight to 80% by weight, of the adhesive,
  a second, elastomer-based polymer component which is substantially not miscible with the polyacrylate component, in particular a synthetic rubber (called the elastomer component hereinbelow) in an amount of from 10% by weight to 40% by weight, preferably from 15% by weight to 30% by weight, of the adhesive.

The above percentages by weight are based on the sum of the polyacrylate component and the elastomer component as 100% by weight.

DETAILED DESCRIPTION

It has been found that the adhesive described within the scope of this specification has outstanding strength and resistance properties under stresses that are critical for sensitive precision mechanical, optical and/or electronic devices. The combination of requirements of high push-out strength and impact strength in particular is often missing in the case of the adhesives used hitherto, and it is difficult to find adhesive systems which provide both aspects simultaneously at a high level. It is particularly difficult also to combine those properties with reworkability and/or heat resistance.

The requirement of good reworkability in particular frequently conflicts with the requirements of a permanent adhesive bond—that is to say an adhesive bond which should not fail at least during the useful life of the products provided with the adhesively bonded composites. Adhesives which are to provide only temporary adhesive bonding, such as, for example, in the case of the temporary adhesive bonding of dust- and scratch-resistant films which are removed again for actual use, must also satisfy completely different requirement profiles.

Accordingly, the invention relates to a composite of two substrates, wherein the composite is to be suitable in particular as an optical, electronic and/or precision mechanical device itself or as a component of such devices, wherein the composite comprises a first substrate and a second substrate and an adhesive layer arranged to join the first substrate to the second substrate, wherein further the adhesive layer comprises or consists of an adhesive having the composition as described in the preceding paragraph. According to the invention, the second polymer component is substantially not miscible with the first polymer component, so that the adhesive is present in the adhesive layer in at least two separate phases. In particular, one phase forms a matrix and the other phase forms a plurality of domains arranged in the matrix. The invention relates further to advantageous embodiments of the composites according to the invention, and to the use of an adhesive as described in the preceding paragraph for permanent adhesive bonding in the production of optical, electronic and/or precision mechanical devices, in particular in the permanent adhesive bonding of rigid components within such devices, but also, for example, in the case of flexible displays.

According to the invention, the composite according to the invention is in particular a permanent composite, that is to say a composite that is to be permanently resistant over the useful life of the arrangement or the device in which the composite is integrated. In contrast to temporarily adhesively bonded components, detachment of the adhesive bond before the end of the lifetime of the arrangement or of the device is generally not provided, but reworkability—that is to say, for example, intentional detachability in the case of incorrectly produced products—is to be possible.

Arrangements of optical, electronic and/or precision mechanical devices are being used ever more frequently in commercial products or are about to be introduced onto the market. Such arrangements comprise inorganic or organic electronic structures, for example organic, organometallic or polymeric semiconductors or also combinations thereof. These arrangements and products are in rigid or flexible form, according to the desired application, wherein there is an increasing demand for flexible arrangements. The production of such arrangements takes place, for example, by printing methods such as relief printing, gravure printing, screen printing, flat screen printing or also so-called "non impact printing", such as, for example, thermal transfer printing, inkjet printing or digital printing. In many cases, however, vacuum methods such as, for example, chemical vapor deposition (CVD), physical vapor deposition (PVD), plasma-enhanced chemical or physical deposition methods (PECVD), sputtering, (plasma) etching or vaporization are also used, wherein structuring is generally effected by means of masks.

There may be mentioned as examples of applications which are advantageous according to the invention electrophoretic or electrochromic structures or displays, organic or polymeric light-emitting diodes (OLEDs or PLEDs) in display devices or as illumination, electroluminescent lamps, light-emitting electrochemical cells (LEECs), organic solar cells, preferably dye-sensitized or polymer solar cells, inorganic solar cells, preferably thin-film solar cells, in particular based on silicon, germanium, copper, indium and/or selenium, organic field-effect transistors, organic switching elements, organic optical amplifiers, organic laser diodes, organic or inorganic sensors or also organic- or inorganic-based RFID transponders.

Homogeneous mixtures are substances mixed at molecular level and, correspondingly, homogeneous systems are single-phase systems. The underlying substances are referred to within the scope of this specification synonymously as "homogeneously miscible" and "compatible" with one another. Accordingly, two or more components are synonymously "not homogeneously miscible" or "not compatible" if they form after intimate mixing not a homogeneous system but at least two phases. Components which, when intimately mixed with one another (for example by shear, in the melt or in solution with subsequent removal of the solvent), form at least two phases, each of which is rich in one of the components but wherein one or both of the phases can contain a more or less large portion of the other components mixed homogeneously therein, are regarded synonymously as "partially homogeneously miscible" and "partially compatible".

The polyacrylate component on its own is preferably a homogeneous phase. The elastomer component can be homogeneous in itself or can be a multiphase system, as is known of microphase-separating block copolymers. The polyacrylate and elastomer components are here so chosen that—after intimate mixing—they are substantially not miscible at 23° C. (that is to say the conventional use temperature for adhesives). "Substantially not miscible" means either that the components are not miscible homogeneously with one another at all, so that none of the phases contains a portion of the second component homogeneously mixed therein, or that the components are partially compatible to such a small degree—that is to say that one or both of the components is able to homogeneously take up only such a small portion of the other component—that the partial compatibility is unimportant for the invention, that is to say the teaching according to the invention is not damaging. The corresponding components are then regarded within the meaning of this specification as being "substantially free" of the other component.

The adhesive used according to the invention is accordingly present in at least two-phase morphology at least at room temperature (23° C.). Very preferably, the polyacrylate component and the elastomer component are substantially not homogeneously miscible in a temperature range of from 0° C. to 50° C., yet more preferably from −30° C. to 80° C.

Components are defined within the meaning of this specification as "substantially not miscible with one another" if the formation of at least two stable phases can be detected physically and/or chemically, wherein one phase is rich in one component—the polyacrylate component—and the second phase is rich in the other component—the elastomer component. A suitable analytical system for a phase separation is, for example, scanning electron microscopy. However, phase separation can also be recognized, for example, by the fact that the different phases have two mutually independent glass transition temperatures in dynamic scanning calorimetry (DSC). Phase separation is present according to the invention when it can clearly be shown at least by one of the analytical methods.

Phase separation can in particular be achieved in such a manner that there are discrete regions ("domains") that are rich in one component (substantially formed of one of the components and free of the other component) in a continuous matrix that is rich in the other component (substantially formed of the other component and free of the first component).

Phase separation for the adhesives used according to the invention takes place in particular in such a manner that the elastomer component is dispersed in a continuous matrix of the polyacrylate component (see FIG. 1). The regions (domains) formed by the elastomer component are preferably substantially spherical. The regions (domains) formed by the elastomer component can also differ from the spherical shape, in particular they can be distorted such as, for example, elongated and oriented in the coating direction. The size of the elastomer domains is typically—but not necessarily—from 0.5 μm to 20 μm, in particular from 1 μm to 10 μm, in their greatest extent. Other domain forms are likewise possible, such as, for example, layer-form or rod-form domains, wherein these can also differ in their shape from ideal structures and can be, for example, bent or distorted.

The polyacrylate component and the elastomer component each consist of a base polymer component, which can be a homopolymer, a copolymer or a mixture of polymers (homopolymers and/or copolymers), and optionally added ingredients (co-components, additives). For the sake of simplicity, the base polymer component is referred to hereinbelow as the "base polymer", without hereby excluding polymer mixtures for the base polymer component in question; correspondingly, "polyacrylate base polymer" is understood as being the base polymer component of the polyacrylate component and "elastomer base polymer" is understood as being the base polymer component of the elastomer component of the adhesive.

The adhesive is advantageously a pressure sensitive adhesive. The expression "pressure sensitive adhesives" (PSA) is understood as meaning, as is conventional, viscoelastic, polymeric compositions which—optionally by the addition of suitable further components, such as, for example, adhesive resins—are permanently tacky and permanently adhesive at the application temperature (unless defined otherwise, at room temperature) and adhere to a large number of surfaces on contact, in particular adhere instantly (which have a so-called "tack" [also referred to as adhesiveness or contact adhesiveness]). They are capable, even at the application temperature without activation by solvents or by heat—optionally under the influence of a more or less high pressure—of wetting a substrate to be bonded sufficiently that interactions are able to form between the composition and the substrate that are sufficient for adhesion. Although not absolutely necessary—in particular where the base polymer components already have sufficient pressure sensitive adhesiveness—it can be advantageous, in particular for pressure sensitive adhesives, to add further components such as, for example, adhesive resins to the base polymer components.

The polyacrylate component and/or the elastomer component can each be present as 100% systems, that is to say based solely on their respective base polymer component and without the further addition of resins, additives or the like. Further preferably, further components, such as, for example, resins, are added to one or both of those two components in addition to the base polymer component.

In an advantageous embodiment of the invention, the polyacrylate component and the elastomer component are composed solely of their respective base polymer component, so that no further polymeric components are present, in particular no resins are present.

In a further development, the adhesive as a whole does not comprise any further constituents apart from the two base polymer components.

The adhesives used according to the invention can in particular be resin-free, because the polyacrylate component itself frequently typically already has pressure sensitive adhesiveness and the pressure sensitive adhesive nature is maintained even when the elastomer component is present. Nevertheless, it may be of interest to improve the adhesive properties further or to optimize them for specific applications, and adhesive resins can therefore be added to the adhesives in an advantageous further development of the invention.

Accordingly, in a further advantageous approach, resins are added to the adhesive. Within the meaning of this specification, oligomeric and polymeric compounds having a number-average molar mass Mn (GPC, test F) of typically not more than 5000 g/mol are regarded as being resins or adhesive resins. Resin mixtures can also be used. In particular, the major portion of the resins (based on the portion by weight in the total resin amount), preferably all the resins, have a softening point (ring and ball method analogously to DIN EN 1427:2007, see below) of at least 80° C. and not more than 150° C.

In a further advantageous embodiment there are added one or more adhesive resins which can be mixed either only with the polyacrylate base polymer or only with the elastomer base polymer or can be mixed into the base polymers of both components, that is to say are compatible or partially compatible with both base polymers. If at least two resins are used, a portion of the resins (that is to say at least one of the resins) can be so chosen that it is readily miscible (compatible) with the polyacrylate base polymer but is poorly miscible or not miscible (substantially incompatible) with the elastomer base polymer, and a second portion of the resins (that is to say at least a second resin) can be so chosen that it is readily miscible (compatible) with the elastomer base polymer but is poorly miscible or not miscible (substantially incompatible) with the polyacrylate base polymer.

The polymer/resin compatibility is dependent inter alia on the molar mass of the polymers and of the resins. The compatibility is generally better when the molar mass(es) are lower. For a given polymer, it can be possible that the low molecular weight constituents of the resin molar mass distribution are compatible with the polymer but the higher molecular weight constituents are not. Such a situation can result, for example, in partial compatibility.

An advantageous embodiment is characterized in that the adhesive comprising the polyacrylate component and the elastomer component comprises one or more resins, in particular adhesive resins, which are compatible with the polyacrylate base polymer, that is to say are readily miscible with the polyacrylate base polymer (referred to hereinbelow as polyacrylate-compatible (adhesive) resins). The polyacrylate-compatible (adhesive) resins can be chosen so that they are not compatible with the elastomer base polymer or so that they are partially compatible therewith; in the case of a plurality of polyacrylate-compatible (adhesive) resins, the representatives can be chosen solely from one of those two categories or from both categories.

Polyacrylate-compatible (adhesive) resins are particularly preferably used in such an amount that the ratio of the polyacrylate base polymer to polyacrylate-compatible resins is in the range of from 100:0 (threshold 100:0 means the absence of polyacrylate-compatible resins) to 50:50, more preferably in the range of from 80:20 to 60:40.

A further advantageous embodiment is characterized in that the adhesive comprising the polyacrylate component and the elastomer component comprises one or more resins, in particular adhesive resins, which are compatible with the elastomer base polymer, that is to say are readily miscible with the elastomer base polymer (referred to hereinbelow as elastomer-compatible (adhesive) resins). The elastomer-compatible (adhesive) resins can be chosen so that they are not compatible with the polyacrylate base polymer or so that they are partially compatible therewith. In the case of a plurality of elastomer-compatible (adhesive) resins, the representatives can be chosen solely from one of those two categories or from both categories. Very preferably, the procedure is such that the elastomer-compatible adhesive resins are substantially incompatible with the polyacrylate base polymer.

Elastomer-compatible (adhesive) resins are particularly preferably used in an amount such that the ratio of elastomer base polymer to elastomer-compatible (adhesive) resins is in the range of from 100:0 (threshold 100:0 means the absence of elastomer-compatible resins) to 50:50, preferably 70:30.

Unless stated otherwise for the above variant embodiments, non-polymeric additives can additionally be present in the above-mentioned embodiments, apart from the mentioned polymer components, but it is in each case also possible to work in the absence of such additives.

The adhesives used according to the invention achieve high bond strengths and have high impact strength. This can be seen from the fact that they meet in particular conditions (i) and (ii) below.
(i) push-out strength (test A)≥80 N, preferably ≥120 N, very preferably ≥150 N
(ii) impact strength, ball drop (test B)≥150 cm, preferably ≥200 cm, very preferably ≥250 cm Further desirable advantages for the intended use according to the invention are good adhesive power on plastics materials, such as, for example, polyethylene as a model substrate for printing inks or coatings with low surface energy, with which bond substrates can be modified, and good heat resistance. Finally, it is desirable that the adhesive can be detached from the substrates again without leaving a residue even after a prolonged bonding time (so-called "reworkability") in order that faulty (intermediate) products can be disassembled in the process of producing the optical, electronic and/or precision mechanical components and valuable subcomponents can thus be recovered.

It is therefore advantageous that, in addition to conditions (i) and (ii), one or more of the following conditions (iii) to (v) are met, namely (iii) and/or (iv) and/or (v).
(iii) adhesive power, RT, PE (test C)≥1.5 N/cm, preferably ≥2.5 N/cm, very preferably ≥4.0 N/cm, without jerking (also referred to in the literature as "slip stick failure" or "stick-slip failure")
(iv) reworkability (test D): satisfied
(v) heat resistance (SAFT test, test E)≥150° C., preferably ≥180° C., very preferably ≥200° C.

Polyacrylate Component

The polyacrylate component comprises one or more polyacrylate-based polymers, which constitute the base polymer component (the polyacrylate base polymer), and optionally one or more crosslinkers. Resins, accelerators and/or further additives can further be present in the polyacrylate component. In addition to the polyacrylate base polymer and the resins, a certain proportion of non-acrylic polymers which are compatible with the base polymer can theoretically be mixed in, but such non-acrylic polymers are preferably not present.

Polyacrylate-based polymers are in particular polymers that are based at least predominantly—in particular to the extent of more than 60% by weight—on acrylic acid esters and/or methacrylic acid, and optionally the free acids thereof, as monomers (referred to as "acrylic monomers" hereinbelow). Polyacrylates are preferably obtainable by free radical polymerization. Polyacrylates may optionally comprise further, copolymerizable monomers.

The polyacrylates can be homopolymers and/or in particular copolymers. Within the meaning of this invention, the term "copolymer" includes both copolymers in which the comonomers used in the polymerization are incorporated purely randomly, and those in which gradients in the comonomer composition and/or local concentrations of individual comonomer types as well as entire blocks of a monomer occur in the polymer chains. Alternating comonomer sequences are also conceivable.

The polyacrylates can be of linear, branched, star-shaped or grafted structure, for example, and they can be homopolymers or copolymers.

The mean molar mass (weight-average $M_w$) of at least one of the polyacrylates of the polyacrylate base polymer, where a plurality of polyacrylates are present advantageously of the predominant portion by weight of the polyacrylates, in particular of all the polyacrylates present, is advantageously in the range of from 250,000 g/mol to 10,000,000 g/mol, preferably in the range of from 500,000 g/mol to 5,000,000 g/mol.

The composition of the polyacrylate component is particularly preferably so chosen that the polyacrylate component has a glass transition temperature (DSC, see below) of not more than 0° C., preferably of not more than −20° C., very preferably of not more than −40° C.

The glass transition temperature of copolymers can advantageously be so chosen, by the choice and composition in terms of amount of the components used, that, in analogy to the Fox equation according to equation G1

$$\frac{1}{T_G} = \sum_n \frac{w_n}{T_{G,n}} \tag{G1}$$

a suitable glass transition point $T_G$ for the polymer is obtained; where
n=consecutive number over the monomers used,
$w_n$=amount by mass of the respective monomer n (% by weight) and $T_{G,n}$=glass transition temperature of the homopolymer of the respective monomers n in K. Glass transition temperatures of homopolymers can depend up to a certain upper molar mass limit on the molar mass of the homopolymer; the reference to glass transition temperatures of homopolymers in this specification takes place in relation to polymers whose molar masses lie above that molar mass limit, that is to say in the constant glass transition temperature range. Determination of the $T_G$ is carried out after removal of the solvent in the uncrosslinked state (in the absence of crosslinkers).

Equation G1 can also be used analogously to determine and predict the glass transition temperature of polymer mixtures. In that case, provided the mixtures are homogeneous, n=consecutive number over the polymers used, $w_n$=amount by mass of the respective polymer n (% by weight) and $T_{G,n}$=glass transition temperature of the polymer n in K.

The static glass transition temperature generally increases as a result of mixing with adhesive resins.

Random copolymers can be used particularly advantageously within the meaning of this invention. At least one polymer type of the polyacrylate component is advantageously based on unfunctionalized α,β-unsaturated esters. If these are used for the at least one polymer in the polyacrylate component of copolymer nature, it is possible to use as monomers in the preparation of this at least one polymer type in principle any compounds known to the person skilled in the art that are suitable for the synthesis of (meth)acrylate (co)polymers. There are preferably used α,β-unsaturated alkyl esters of the general structure

$$CH_2=C(R^1)(COOR^2) \qquad (I)$$

wherein $R^1$=H or $CH_3$ and $R^2$=H or linear, branched or cyclic, saturated or unsaturated alkyl radicals having from 1 to 30 carbon atoms, in particular having from 4 to 18 carbon atoms.

At least one type of monomers for the polyacrylates of the polyacrylate component are those whose homopolymer has a glass transition temperature $T_G$ of not more than 0° C., very preferably not more than −20° C. These are in particular esters of acrylic acid with linear alcohols having up to 10 carbon atoms or branched alcohols having at least 4 carbon atoms and esters of methacrylic acid with linear alcohols having from 8 to 10 carbon atoms or branched alcohols having at least 10 carbon atoms. Furthermore, monomers whose homopolymer has a glass transition temperature $T_G$ of more than 0° C. can additionally be used. As specific examples according to the invention there are preferably used one or more members chosen from the group comprising methyl acrylate, methyl methacrylate, ethyl acrylate, n-propyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, the branched isomers of the above-mentioned compounds, such as, for example, 2-ethylhexyl acrylate, 2-ethylhexyl methacrylate, 2-propylheptyl acrylate.

Monomers having the tendency to form semicrystalline regions in the polymer can further be chosen. This behavior is found for acrylic acid esters and methacrylic acid esters with a linear alkyl radical having at least 12 carbon atoms in the alcohol moiety, preferably having at least 14 carbon atoms in the alcohol moiety. Stearyl acrylate and/or stearyl methacrylate, for example, can particularly advantageously be used here according to the invention.

Further monomers which can advantageously be used are monofunctional acrylates and/or methacrylates of bridged cycloalkyl alcohols having at least 6 carbon atoms in the cycloalkyl alcohol moiety. The cycloalkyl alcohols can also be substituted, for example by $C_1$- to $C_6$-alkyl groups, halogen atoms or cyano groups. Specific examples are cyclohexyl methacrylates, isobornyl acrylate, isobornyl methacrylate and 3,5-dimethyladamantyl acrylate.

In order to vary the glass transition temperature, it is possible to use for the preparation of the polyacrylates also a portion of comonomers whose homopolymers have a high static glass transition temperature. Suitable components are aromatic vinyl compounds, such as, for example, styrene, wherein the aromatic nuclei preferably comprise $C_4$ to $C_{18}$ structural units and can also contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenyl acrylate and methacrylate, 2-naphthyl acrylate and methacrylate, as well as mixtures of such monomers, whereby this list is not exhaustive.

As comonomers to the acrylic monomers there can also be used further monomers which are copolymerizable with acrylic monomers, for example in an amount of up to 40% by weight. Such comonomers can in principle be any compounds having copolymerizable double bonds which are compatible with the acrylates, such as, for example, vinyl compounds. Such vinyl compounds can be chosen wholly or partially from the group comprising vinyl esters, vinyl ethers, vinyl halides, vinylidene halides, vinyl compounds with aromatic rings and heterocyclic rings, in particular in the α-position relative to the double bond. Comonomers that are particularly preferably suitable are, for example, vinyl acetate, vinyl formamide, vinylpyridine, ethyl vinyl ether, vinyl chloride, vinylidene chloride, acrylonitrile.

However, other compounds copolymerizable with acrylic monomers can also be used here.

There are particularly advantageously added to the polyacrylate component one or more crosslinkers for a chemical and/or physical crosslinking. However, since radiation crosslinking of the polyacrylate component is also possible in principle, crosslinkers are not necessarily present.

Crosslinkers are compounds—in particular bi- or polyfunctional, mostly low molecular weight compounds— which are able to react under the chosen crosslinking conditions with suitable—in particular functional—groups of the polymers to be crosslinked, thus linking two or more polymers or polymer sites with one another (form "bridges") and accordingly create a network from the polymer or polymers to be crosslinked. This generally results in increased cohesion. The degree of crosslinking depends on the number of bridges that are formed.

In the present case, suitable crosslinkers are in principle any crosslinker systems known to the person skilled in the art for the formation of, in particular, covalent, coordinative or associative bond systems with correspondingly equipped (meth)acrylate monomers, according to the nature of the chosen polymers and their functional groups. Examples of chemical crosslinking systems are di- or poly-functional isocyanates or di- or poly-functional epoxides or di- or poly-functional hydroxides or di- or poly-functional amines or di- or poly-functional acid anhydrides. Combinations of different crosslinkers are likewise conceivable.

Further suitable crosslinkers which may be mentioned are chelate formers, which in combination with acid functionalities in polymer chains form complexes which act as crosslinking points.

It is particularly advantageous for effective crosslinking if at least a portion of the polyacrylates contain functional groups with which the crosslinkers in question are able to react. There are preferably used for this purpose monomers with functional groups selected from the group comprising: hydroxy, carboxy, sulfonic acid or phosphonic acid groups, acid anhydrides, epoxides, amines.

Particularly preferred examples of monomers for polyacrylates are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

It has been found to be particularly advantageous to use as a crosslinker from 0.03 to 0.2 part by weight, in particular from 0.04 to 0.15 part by weight, N,N,N',N'-tetrakis(2,3-epoxypropyl)-m-xylene-a,a'-diamine (tetraglycidyl-meta-xylenediamine; CAS 63738-22-7), based on 100 parts by weight of polyacrylate base polymer.

Alternatively or in addition, it can be advantageous to crosslink the adhesive by means of radiation. Suitable as the radiation for this purpose are ultraviolet light (especially when suitable photoinitiators are added to the formulation or at least one polymer in the acrylate component comprises comonomers having units with photoinitiating functionality) and/or electron beams.

It can be advantageous for radiation-induced crosslinking if a portion of the monomers used comprises functional groups which promote subsequent radiation crosslinking. Suitable copolymerizable photoinitiators are, for example, benzoin acrylate and acrylate-functionalized benzophenone derivatives. Monomers which promote crosslinking by electron irradiation are, for example, tetrahydrofurfuryl acrylate, N-tert-butylacrylamide and allyl acrylate.

For the chemical and/or physical and/or radiation-induced crosslinking, reference is made in particular to the relevant prior art.

In an advantageous embodiment of the invention, there are added to the polyacrylate component one or more polyacrylate-compatible adhesive resins, which are substantially compatible with the polyacrylate. The adhesive resins known to be suitable therefor can in principle be used here. Terpene-phenol resins are particularly preferably used. However, it is also possible to use, for example, colophony derivatives, in particular colophony esters.

The polyacrylate-compatible resins preferably have a DACP value of less than 0° C., very preferably of not more than −20° C., and/or preferably an MMAP value of less than 40° C., very preferably of not more than 20° C. For the determination of MMAP and DACP values, reference is made to C. Donker, PSTC Annual Technical Seminar, Proceedings, p. 149-164, May 2001.

The polyacrylate component can further comprise additives such as initiators, activators, accelerators for the crosslinking and the like.

For the polyacrylate component, polyacrylate compositions as described in particular in WO 2012/062589 A have been found to be very suitable.

Elastomer Component

The elastomer component, which is substantially not compatible with the polyacrylate component, advantageously comprises a synthetic rubber or a plurality of synthetic rubbers chosen independently of one another as the base polymer component, as well as optionally resins and/or other additives.

Block copolymers are preferred for the elastomer component. According to the invention, the synthetic rubbers are advantageously in particular those in the form of thermoplastic block copolymers, the structure of which can be represented by one of the following formulae:

$$A\text{-}B \quad (II)$$

$$A\text{-}B\text{—}X(A'\text{-}B')_n \quad (III)$$

wherein

A or A' is a polymer formed by polymerization of a vinyl aromatic compound, such as, for example, styrene or α-methylstyrene, B or B' is a polymer of an isoprene, butadiene, a farnesene isomer or a mixture of butadiene and isoprene or a mixture of butadiene and styrene, or comprising wholly or partially ethylene, propylene, butylene and/or isobutylene, X is an optional linking group (e.g. a radical of a coupling reagent or initiator), n is an integer from 1 to 4, $(A'\text{-}B')_n$ can be linked to X or to (A-B) via A' (structure IIIa) or B' (structure IIIb), preferably via B', A can be=A' in terms of composition and/or molar mass and B can be=B' in terms of composition and/or molar mass.

Suitable vinyl aromatic block copolymers comprise one or more rubber-like blocks B or B' (soft blocks, elastomer blocks) and one or more glassy blocks A or A'. In some embodiments, the block copolymer comprises at least one glassy block. In some further embodiments according to the invention, the block copolymer comprises from one to five glassy blocks.

In some advantageous embodiments, there is used in addition to the structures II, IIIa and/or IIIb or exclusively a block copolymer which is a multiarm block copolymer. This is described by the general formula

$$Q_m\text{-}Y \quad (IV)$$

wherein Q represents an arm of the multiarm block copolymer and m in turn represents the number of arms, wherein m is an integer of at least 3. Y is the radical of a multifunctional linking reagent, which originates, for example, from a coupling reagent or from a multifunctional initiator. In particular, each arm Q has independently the formula A*-B*, wherein A* and B* are each chosen independently of the other arms according to the above definitions for A or A' and B or B', so that, analogously to structures II, IIIa and IIIb, A* in each case represents a glassy block and B* represents a soft block. Of course it is also possible to choose identical A*s and/or identical B*s for a plurality of arms Q or for all the arms Q.

The blocks A, A and A* are together referred to as A blocks hereinbelow. Correspondingly, the blocks B, B' and B* are together referred to as B blocks hereinbelow.

A blocks are generally glassy blocks having a glass transition temperature (DSC, see below) which is above room temperature (room temperature is understood within the context of this invention as being 23° C.). In some advantageous embodiments, the $T_G$ of the glassy block is at least 40° C., preferably at least 60° C., yet more preferably at least 80° C. or very preferably at least 100° C.

The vinyl aromatic block copolymer further generally comprises one or more rubber-like B blocks or [soft blocks or elastomer blocks] having a $T_G$ below room temperature. In some embodiments, the $T_G$ of the soft block is below −30° C. or even below −60° C.

In addition to the particularly preferred monomers according to the invention mentioned for formulae II and IIIa/IIIb and IV for the B blocks, further advantageous embodiments comprise a polymerized conjugated diene, a hydrogenated derivative of a polymerized conjugated diene or a combination thereof. In some embodiments, the conjugated dienes comprise from 4 to 18 carbon atoms. Examples of further advantageous conjugated dienes for the rubber-like B blocks which may be mentioned are additionally ethylbutadiene, phenylbutadiene, piperylene, pentadiene, hexadiene, ethylhexadiene and dimethylbutadiene, wherein the polymerized conjugated dienes can be present as a homopolymer or as a copolymer.

The content of A blocks, based on the total block copolymers, is on average preferably from 10 to 40% by weight, more preferably from 15 to 33% by weight.

Polystyrene is preferred as the polymer for A blocks. Preferred polymers for B blocks are polybutadiene, polyisoprene, polyfarnesene and partially or completely hydrogenated derivatives thereof, such as polyethylenebutylene, polyethylenepropylene, polyethylene-ethylenepropylene or polybutylenebutadiene or polyisobutylene. Polybutadiene is very preferred.

Mixtures of different block copolymers can be used. Preference is given to the use of triblock copolymers ABA and/or diblock copolymers AB.

Block copolymers can be linear, radial or star-shaped (multiarm), also independently of the structures II and III.

Hydrocarbon resins can particularly advantageously be used as elastomer-compatible resins. Suitable adhesive resins for this class of resins are inter alia preferably hydrogenated polymers of dicyclopentadiene, non-hydrogenated, partially, selectively or completely hydrogenated hydrocarbon resins based on C5, C5/C9 or C9 monomer streams, or particularly preferably polyterpene resins based on α-pinene and/or β-pinene and/or δ-limonene. The above-mentioned adhesive resins can be used both alone and in a mixture. Ideally, it is substantially not compatible with the acrylate polymers. The aromatic portion should therefore not be chosen to be too high. Suitable adhesive resins of this class of resins are in particular compatible with the soft block or soft blocks of the elastomer component. The hydrocarbon resins of the pressure sensitive adhesive according to the invention that are compatible with the synthetic rubbers preferably have a DACP value of at least 0° C., very preferably of at least 20° C., and/or preferably an MMAP value of at least 40° C., very preferably of at least 60° C. For the determination of MMAP and DACP values, reference is made to C. Donker, PSTC Annual Technical Seminar, Proceedings, p. 149-164, May 2001.

The hydrocarbon resins which can optionally be used within the meaning of this specification are also oligomeric and polymeric compounds having a number-average molar mass Mn of typically not more than 5000 g/mol. It is also possible to use hydrocarbon resin mixtures. In particular, the major portion of the hydrocarbon resins (based on the portion by weight in the total amount of hydrocarbon resin), preferably all the hydrocarbon resins, have a softening point of at least 80° C. and not more than 150° C. (ring and ball method analogously to DIN EN 1427:2007, see below).

The adhesive formulation can additionally also comprise adhesive resins which are liquid at room temperature, that is to say have a resin softening point below 80° C. or even below 25° C.

It is also conceivable to use aromatic hydrocarbon resins which are compatible with the A blocks. In particular such adhesive resins 2 can also be (partially) compatible with the polyacrylate component.

Adhesive Resins Compatible with the Polyacrylate and the Elastomer Component

In an advantageous variant of the invention, in addition to polyacrylate-compatible adhesive resin(s) and/or in addition to elastomer-compatible adhesive resin(s) or alternatively to those adhesive resins, there are used one or more adhesive resins which are compatible with both components or which are compatible with one component and partially compatible with the other component.

For example, it is possible to use one or more polyacrylate-compatible adhesive resins which are at least partially compatible or completely miscible with the elastomer component. If thermoplastic block copolymers are used as the elastomer component, as described above, the polyacrylate-compatible adhesive resins used can be at least partially compatible or completely miscible with the A blocks and/or the B blocks of the elastomer component.

For example, it is also possible to use one or more adhesive resins which are compatible with the elastomer component and at least partially compatible with the polyacrylate component. If thermoplastic block copolymers are used as the elastomer component, as described above, the polyacrylate-compatible adhesive resins used can be miscible with the A blocks and/or the B blocks of the elastomer component.

Further Optional Constituents

If desired in an individual case, there can be added to the adhesive additives such as plasticizers, fillers (e.g. fibers, carbon black, zinc oxide, titanium dioxide, chalk, solid or hollow glass beads, microspheres of other materials, silica, silicates), pigments, dyes, compounding agents, flame retardants in each case less than 10%, antistatics, light stabilizers, anti-aging agents, primary and/or secondary antioxidants in each case less than 2% and the like, independently of one another.

Foaming

The adhesive layer may optionally be foamed, which leads to advantageous further developments of the invention. In other advantageous embodiments of the invention, on the other hand, the adhesive is present in the non-foamed state. Whether foaming is to be carried out or not depends, for example, on the intended field of use of the adhesive. For example, foamed adhesives can increase the shock-absorbing action, so that the adhesive is able to absorb or deflect impact energy in the adhesive film.

Foaming can take place by means of any chemical and/or physical methods. However, a foamed pressure sensitive adhesive according to the invention is preferably obtained by introducing and then expanding microballoons. "Microballoons" are understood as being hollow microspheres which are elastic and thus expandable in their basic state and which have a thermoplastic polymer shell. These spheres are filled with low-boiling liquids or liquefied gas. As the shell material there are used in particular polyacrylonitrile, PVDC, PVC or polyacrylates. Suitable as the low-boiling liquid are in particular hydrocarbons of the lower alkanes, for example isobutane or isopentane, which are enclosed in the polymer shell as liquefied gas under pressure.

By action on the microballoons, in particular by the action of heat, the outer polymer shell softens. At the same time, the liquid blowing gas in the shell changes to its gaseous state. The microballoons thereby expand irreversibly and expand three-dimensionally. The expansion is complete when the internal and external pressures are equalized. Since the polymer shell is retained, a closed-cell foam is thus obtained.

A large number of microballoon types are available commercially, which differ essentially by their size (from 6 to 45 µm diameter in the unexpanded state) and the start temperatures required for their expansion (from 75 to 220° C.). An example of commercially available microballoons are the Expancel® DU types (DU=dry unexpanded) from Akzo Nobel. Unexpanded microballoon types are also available in the form of an aqueous dispersion with a solid or microballoon content of approximately from 40 to 45% by weight, and further also in the form of polymer-bonded microballoons (masterbatches), for example in ethylvinyl acetate with a microballoon concentration of approximately 65% by weight. Both the microballoon dispersions and the masterbatches, like the DU types, are suitable for the production of a foamed pressure sensitive adhesive according to the invention.

A foamed pressure sensitive adhesive according to the invention can also be produced using so-called pre-expanded microballoons. In this group, the expansion takes place before the microballoons are mixed into the polymer matrix. Pre-expanded microballoons are available commercially, for example, under the name Dualite® or with the type designation DE (dry expanded).

The density of the adhesive films in the case of foamed adhesive layers is preferably from 200 kg/m$^3$ to 1000 kg/m$^3$, more preferably from 300 kg/m$^3$ to 900 kg/m$^3$, very preferably from 400 kg/m$^3$ to 800 kg/m$^3$.

Substrates

Owing to their outstanding unexpected properties, the described adhesives are outstandingly suitable for the adhesive bonding of substrates—in particular also rigid and thus usually also brittle substrates—in particular in the field of optical, electronic and/or precision mechanical devices. Such devices are conventionally supplied in portable variants, that is to say in a form which is intended to allow the owner of the device to take the device with him at any time and which is usually regularly taken with him. There is the risk here of the device being damaged if it is dropped. However, the adhesives are also outstandingly suitable owing to their properties for devices which are not to be transported permanently but only occasionally. Optical, electronic and/or precision mechanical structural elements which are transported during an installation process can also be damaged if they are dropped, so that pressure sensitive adhesives according to the invention are useful here too. It has been found that the adhesive presented within the scope of this specification has outstanding strength and resistance properties under stresses that are critical for sensitive precision mechanical, optical and/or electronic devices.

In a preferred embodiment, rigid substrates are permanently adhesively bonded to one another. Rigid substrates within the meaning of this specification are, for example, substrates—in particular flat substrates—of glass, of metal, of ceramics or of other materials, including substrates which have been surface-modified, such as, for example, printed, coated, metalized and anodized, with a modulus of elasticity (DIN EN ISO 527) of over 10 GPa, preferably of over 50 GPa, the above-mentioned substrates in particular with a thickness of at least 500 µm, but also flat substrates of plastics materials such as polyester (PE), polymethyl methacrylate (PMMA), polycarbonate (PC), of acrylonitrile-butadiene-styrene copolymers (ABS) or of other materials with a modulus of elasticity of at least 1 GPa; but not more than 10 GPa, the plastics substrates and substrates of materials with a modulus of elasticity of at least 1 GPa but not more than 10 GPa in particular with a thickness of at least 1 mm. The flat substrates are conventionally also used with a greater thickness, for example 2 mm or more.

The substrates used are regarded as being rigid in particular when the product of the thickness and the modulus of elasticity is at least 500 N/mm. Substrates in which the product of the thickness and the modulus of elasticity is at least 2500 N/mm, yet more preferably 5000 N/mm, are particularly preferably used. The more rigid the substrates used, the less well the substrate itself is able to absorb a shock.

However, the adhesive is also outstandingly suitable for the permanent adhesive bonding of flexible materials, in particular in the production of flexible displays. Such displays are becoming increasingly important.

Advantageously, the adhesive can be used for the adhesive bonding of windows or lenses in casings of precision mechanical, optical and/or electronic devices (so-called "lens mounting"). At least one of the rigid or flexible substrates is thereby transparent or translucent. The transparent or translucent substrate can be, for example, a window or an optical lens for the purpose of protecting sensitive components arranged therebeneath—such components can be, for example, liquid crystal displays (LCD), light-emitting diodes (LED) or organic light-emitting diodes (OLED) of displays, but also printed circuits or other sensitive electronic components; this is very important, for example, in the case of use for touch-sensitive displays—and/or for bringing about optical effects for the functioning of the device—for example light refraction, light focusing, light attenuation, light amplification, etc.

Very advantageously, the transparent substrate is so chosen that it has a haze value of not more than 50%, preferably of not more than 10%, very preferably of not more than 5% (measured according to ASTM D 1003).

The second substrate is preferably likewise a component of a precision mechanical, optical and/or electronic device. In particular, casings of such devices or mounts for windows or lenses as described above come into consideration here.

In a preferred approach, the transparent or translucent substrate is a substrate of glass, polymethyl methacrylate and/or polycarbonate.

In particular, the second substrate can be made of plastics materials such as acrylonitrile-butadiene-styrene copolymers (ABS), polyamide or polycarbonate, which in particular can also be glass fiber reinforced; or made of metals, such as aluminum—also anodized aluminum—or magnesium and metal alloys.

It is also possible to add to the substrate materials additives, such as, for example, dyes, light stabilizers, anti-aging agents, plasticizers or the like, provided that this is advantageous for the intended use; in the case of transparent or translucent materials in particular, provided that it does not interfere with those optical properties or interferes with them only negligibly.

According to the invention, the composite according to the invention is thus a component of an electronic, optical or precision mechanical device.

Electronic, optical and precision mechanical devices within the meaning of this application are in particular devices that are to be classified in class 9 of the international classification of goods and services for the registration of marks (Nice Classification); 10th edition (NCL(10-2013)), insofar as they are electronic, optical or precision mechanical devices, as well as timepieces and chronometric instruments according to class 14 (NCL(10-2013)), such as in particular scientific, nautical, surveying, photographic, cinematographic, optical, weighing, measuring, signaling, checking, life-saving and teaching apparatus and instruments apparatus and instruments for conducting, switching, transforming, accumulating, regulating and controlling electricity image recording, processing, transmission and reproduction devices, such as, for example, televisions and the like acoustic recording, processing, transmission and reproduction devices, such as, for example, radios and the like computers, calculators and data processing devices, mathematical devices and instruments, computer accessories, office equipment—such as, for example, printers, fax machines, copiers, typewriters —, data storage devices remote communication devices and multifunctional devices with a remote communication function, such as, for example, telephones, answering machines chemical and physical measuring devices, control devices and instruments, such as, for example, battery chargers, multimeters, lamps, tachometers nautical devices and instruments optical devices and instruments medical devices and instruments and those for athletes timepieces and chronometers solar cell modules, such as, for example, electrochemical dye-sensitized solar cells, organic solar cells, thin-film cells, fire-extinguishing devices.

Technical development is increasingly being directed at such devices, which are being made increasingly smaller and lighter so that their owner is able to take them with him at any time, and usually regularly does take them with him. This is conventionally effected by achieving lower weights and/or a suitable size for such devices. Within the scope of this specification, such devices are also referred to as mobile devices or portable devices. As part of this development trend, precision mechanical and optical devices are increasingly (also) being provided with electronic components, which increases the possibilities for minimization. Because mobile devices are carried, they are exposed to increased—in particular mechanical—stresses, for example by hitting edges, by being dropped, by contact with other hard objects in a bag, but also as a result of the permanent movement due to their being carried. However, mobile devices are also exposed to greater stresses due to the influence of moisture, temperature influences and the like than "immobile" devices, which are usually installed in internal spaces and are not or are scarcely moved. The adhesive used according to the invention has particularly preferably been found to withstand and, in an ideal case, also attenuate or compensate for such disturbing influences.

Accordingly, the invention relates particularly preferably to mobile devices, since the adhesive used according to the invention is of particular benefit here owing to its unexpectedly good properties. Some portable devices are listed below, without wishing to limit the subject matter of the invention unnecessarily by the specifically mentioned representatives in this list.

cameras, digital cameras, photographic accessories (such as exposure meters, flashguns, diaphragms, camera casings, lenses, etc.), film cameras, video cameras microcomputers (portable computers, hand-held computers, hand-held calculators), laptops, notebooks, netbooks, ultrabooks, tablet computers, handhelds, electronic diaries and organizers (so-called "electronic organizers" or "personal digital assistants", PDA, palmtops), modems computer accessories and operating units for electronic devices, such as mice, drawing pads, graphics tablets, microphones, loudspeakers, games consoles, gamepads, remote controls, remote operating devices, touchpads monitors, displays, screens, touch-sensitive screens (sensor screens, touchscreen devices), projectors reading devices for electronic books ("E-books")

mini TVs, pocket TVs, devices for playing films, video players radios (including mini and pocket radios), Walkmans, Discmans, music players for e.g. CD, DVD, Blu-ray, cassettes, USB, MP3, headphones cordless telephones, mobile telephones, smart phones, two-way radios, hands-free telephones, devices for summoning people (pagers, bleepers)

mobile defibrillators, blood sugar meters, blood pressure monitors, step counters, pulse meters torches, laser pointers mobile detectors, optical magnifiers, binoculars, night vision devices GPS devices, navigation devices, portable interface devices for satellite communications data storage devices (USB sticks, external hard drives, memory cards)

wristwatches, digital watches, pocket watches, chain watches, stopwatches.

Production of the Composites Used According to the Invention

Either solvent-containing or solvent-free processes are used for producing the formulation for the adhesives. The formulation is preferably produced in an organic solvent or in a mixture of different organic solvents.

The composites according to the invention are preferably produced by using the adhesive in the form of a backing-free adhesive film or in the form of an adhesive tape comprising at least one backing. In both cases, the adhesive is in one method step coated onto a backing: In the case of films that are used without a backing (so-called transfer adhesive tapes), the adhesive is coated onto a temporary backing (so-called release liner such as release papers or release films), which is removed again for use and which serves the purpose of intermediate manageability. The adhesive film can then be transferred by lamination to the substrate to be adhesively bonded, for example. Suitable as temporary backings are the conventional materials, such as release papers and release films, in particular also in anti-adhesively coated form (for example by siliconization).

In the case of adhesive tapes with a permanent backing, coating can take place directly onto the backing, or the adhesive is likewise first coated onto a temporary backing and then transferred from there to the permanent backing by lamination. Suitable as permanent backings are the conventional materials, such as, for example, plastics films, particularly preferably films of transparent, translucent, colored, white or black plastics material such as in particular polyester, especially polyethylene terephthalate. Backing thicknesses are typically from 1 µm to 250 µm, preferably from 10 µm to 150 µm.

Before the coating, the solvent (mixture) may optionally be removed. Coating then takes place in a solvent-free manner. Coating can also take place in a solvent-containing manner. The formulation is then dried after the coating.

The solvent-containing formulation is advantageously stirred or otherwise moved in convection before being fed to the coating unit, very advantageously immediately before being fed to the coating unit.

The formulation can also be produced in a solvent-free manner. To that end, a thread of solvent-free polyacrylate, for example, is fed to a twin-screw extruder, which is loaded beforehand and/or subsequently with synthetic rubber. Resins can in particular be fed in subsequently, for example via a resin melt, or alternatively can be added in solid form. The formulation can either be fed directly to a coating unit (nozzle or multi-roll mill) or first introduced into a vessel (barrel). Coating can then take place offline via a nozzle or multi-roll mill and fed through a melt pump or barrel melt and optionally a feeding extruder.

A conceivable production concept comprises the following procedure. A polyacrylate is polymerized in solution. The elastomer component is dissolved spatially separately in solvent, and adhesive resins are optionally added. The two solutions are mixed offline or inline before coating, and crosslinker and/or other additives are optionally added. The solvent-containing formulation is coated, dried and wound up.

A further conceivable production concept comprises the following procedure. The elastomer component and optionally also the adhesive resins are pre-dissolved in solvent. The polyacrylate is polymerized in the solution. Crosslinker and/or other additives are optionally added to the solvent-containing formulation inline or offline, if desired, and the formulation is coated, dried and wound up.

Solvent-free polyacrylates can be produced by concentration from polymers prepared in solvent or in aqueous dispersion.

Adhesives used according to the invention are used in particular in double-sided adhesive tapes. These can be backing-free (transfer adhesive tapes). However, there are also conceivable as further product designs backing-containing double-sided adhesive tapes with at least one layer of an adhesive according to the invention. Layer thicknesses can then typically be more than 2.5 µm and up to 1 mm, preferably from 20 µm to 250 µm. Adhesive tapes can be from 5 µm to 1 mm thick, preferably be from 20 µm to 500 µm thick. The adhesive according to the invention can be present in the non-foamed or foamed state.

REFERENCES

The stated number-average molar mass $M_n$ and weight-average molar mass $M_w$ in this specification relate to determination by gel permeation chromatography (GPC).

The determination is carried out on a 100 µl clear-filtered sample (sample concentration 4 g/l). Tetrahydrofuran with 0.1 vol. % trifluoroacetic acid is used as the eluent. The measurement is performed at 25° C. The precolumn used is a column of type PSS-SDV, 5 µm, $10^3$ Å, 8.0 mm*50 mm (details here and below are in the following order: type, particle size, porosity, inside diameter*length; 1 Å=$10^{-10}$ m). For separation there is used a combination of columns of type PSS-SDV, 5 µm, $10^3$ Å and $10^5$ Å and $10^6$ Å with in each case 8.0 mm*300 mm (columns from Polymer Standards Service; detection by means of a Shodex RI71 differential refractometer). The throughput is 1.0 ml per minute. Calibration is carried out in the case of polyacrylates against PMMA standards (polymethyl methacrylate calibration) and otherwise (resins, elastomers) against PS standards (polystyrene calibration).

Data relating to the softening point—also referred to synonymously as the softening temperature—of oligomeric and polymeric compounds, such as, for example, of the resins, relate to the ring and ball method according to DIN EN 1427:2007 with appropriate application of the provisions (testing of the oligomer or polymer sample instead of bitumen, with the procedure otherwise being retained).

Glass transition points—referred to synonymously as glass transition temperatures—are indicated as the result of measurements by means of dynamic scanning calorimetry (DSC) according to DIN 53 765; in particular sections 7.1 and 8.1 but with uniform heating and cooling rates of 10 K/min in all the heating and cooling steps (see DIN 53 765; section 7.1; note 1). The original weighed amount of the sample is 20 mg. Pretreatment of the pressure sensitive adhesive is carried out (see section 7.1, first run). Temperature limits: −140° C. (instead of $T_G$−50° C.)/+200° C. (instead of $T_G$+50° C.). The indicated glass transition temperature $T_G$ is the sample temperature in the heating operation of the second run at which half of the change in specific heat capacity has been reached.

Experimental Section
Test Methods

There were used as the adhesive tape sample double-sided adhesive prototypes containing a 12 µm polyester film provided with a 46 µm thick pressure sensitive adhesive layer on both sides.

Test A: Push-Out Strength

The push-out test provides information about the degree of resistance of an adhesive bond of a component in a frame-shaped body, for example a window in a casing.

A rectangular, frame-shaped sample was cut out of the adhesive tape to be tested (outside dimensions 43 mm×33 mm; border width in each case 2.0 mm, inside dimensions (window opening) 39 mm×29 mm, adhesive surface on the upper and lower side in each case 288 mm²). This sample was adhesively bonded to a rectangular ABS plastics frame (ABS=acrylonitrile-butadiene-styrene copolymer) (outside dimensions 50 mm×40 mm, border width of the long borders in each case 8 mm; border width of the short borders in each case 10 mm; inside dimensions (window opening) 30 mm×24 mm; thickness 3 mm). A rectangular PMMA sheet (PMMA=polymethyl methacrylate) of dimensions 45 mm×35 mm was adhesively bonded to the other side of the sample of the double-sided adhesive tape. The whole of the available adhesive surface of the adhesive tape was used. The ABS frame, the adhesive tape sample and the PMMA window were adhesively bonded in such a manner that the geometric centers, the bisecting lines of the acute diagonal angles and the bisecting lines of the obtuse diagonal angles of the rectangles each lay on top of one another (corner on corner, long sides on long sides, short sides on short sides). The adhesive bonding surface was 360 mm². The bond was pressed for 5 s with 10 bar and stored for 24 hours conditioned at 23° C./50% relative humidity.

Immediately after storage, the adhesive composite comprising the ABS frame, the adhesive tape and the PMMA sheet was placed with the protruding edges of the ABS frame on a frame structure (sample holder) in such a manner that the composite was oriented horizontally and the PMMA sheet pointed downwards, hanging freely. A plunger is then moved through the window of the ABS frame, perpendicularly from above, at a constant speed of 10 mm/s, so that it presses the PMMA plate centrally, and the force (determined from the pressure and the contact surface between the plunger and the plate) is recorded in dependence on the time from first contact of the plunger with the PMMA plate to shortly after the PMMA plate has fallen (measuring conditions 23° C., 50% relative humidity). The force acting immediately before failure of the adhesive bond between the PMMA plate and the ABS frame (maximum force $F_{max}$ in the force-time diagram in N) is recorded as the result of the push-out test.

Test B: Ball Drop Test (Impact Strength)

This test provides information about the shock resistance of the test pieces adhesively bonded to the adhesive tape according to the invention or to comparative samples, which are attributable to the shock absorbing capacity of the adhesive tape.

A square, frame-shaped sample was cut out of the adhesive tape to be tested (outside dimensions 33 mm×33 mm; border width 3.0 mm; inside dimensions (window opening) 27 mm×27 mm). This sample was adhesively bonded to an ABS frame (outside dimensions 50 mm×50 mm; border width 12.5 mm; inside dimensions (window opening) 25 mm×25 mm; thickness 3 mm). A PMMA window of 35 mm×35 mm was adhesively bonded to the other side of the double-sided adhesive tape. The ABS frame, the adhesive tape frame and the PMMA window were adhesively bonded in such a manner that the geometric centers and the diagonals each lay on top of one another (corner on corner). The adhesive bonding surface was 360 mm². The adhesive bond was pressed for 5 s with 10 bar and stored for 24 hours conditioned at 23° C./50% relative humidity. Immediately after storage, the adhesive composite comprising the ABS frame, the adhesive tape and the PMMA sheet was placed with the protruding edges of the ABS frame on a frame structure (sample holder) in such a manner that the composite was oriented horizontally and the PMMA sheet pointed downwards, hanging freely. A steel ball (diameter 15 mm, mass 5.6 g) was dropped perpendicularly, centered on the PMMA sheet, onto the sample so arranged from a height of 250 cm (through the window of the ABS frame) (measuring conditions 23° C., 50% relative humidity). Three tests were carried out with each sample, unless the PMMA sheet had become detached beforehand.

The ball drop test is deemed to be passed if the adhesive bond does not become detached in any of the three tests.

Test C: Adhesive Power, RT, PE

The test is carried out in accordance with PSTC-1.

A 2 cm wide and 15 cm long strip of the adhesive tape sample is covered on one of its adhesive sides with a 36 μm thick etched PET film and adhesively bonded with the other adhesive tape side to a ground steel plate. It is ensured that adhesive bonding has definitely taken place by twice-rolling the sample five times using a 4 kg roll. The plate is mounted and the self-adhesive strip is pulled off via its free end on a tensile tester at a pull-off angle of 180° and at a rate of 300 mm/min. The test atmosphere is 23° C./50% relative humidity. The results are given in N/cm.

Test D: Reworkability

The adhesive tape to be tested, in the form of a 20 mm×150 mm strip, is covered on one of its adhesive sides with a 36 μm thick etched PET film. The strip is adhesively bonded on the other adhesive side to a conditioned polycarbonate plate and rolled once to and fro using a 4 kg roller. The composite is stored for 3 days at 40° C.

After 3 days, the samples are removed, conditioned at RT for at least 2 hours and pulled off by hand. The test is carried out at a pull-off angle of 90° and the speed is increased during pulling off from slow through moderate to fast.

An evaluation is made of how the adhesive tape fails at the 3 speeds;

for example: A/A/A corresponds to adhesive failure at a slow (0.1 mm/min), moderate (2 m/min) and fast (10 m/min) pull-off speed. The following abbreviations are used:

A: adhesive failure (advantageous)
U: rewinding (not advantageous)
K: cohesive failure (not advantageous)
MB: mixed fracture (not advantageous)

Test E: Shear Adhesion Failure Temperature (tesa-SAFT), Heat Resistance

This test is used to quickly test the shear strength of adhesive tapes under temperature stress. To that end, the adhesive tape to be tested is adhesively bonded to a temperature-controlled steel plate and loaded with a weight (50 g), and the shear distance is recorded.

Preparation of the Test Piece:

The adhesive tape to be tested is adhesively bonded with one of its adhesive sides to a 50 μm thick aluminum foil. The adhesive tape so prepared is cut to a size of 10 mm* 50 mm.

The cut adhesive tape sample is adhesively bonded with the other adhesive side to a polished steel test plate cleaned with acetone (material 1.4301, DIN EN 10088-2, surface 2R, surface roughness Ra=30 to 60 nm, dimensions 50 mm*13 mm*1.5 mm) in such a manner that the bonding surface of the sample height*width=13 mm*10 mm and the steel test plate protrudes by 2 mm at the top edge. The sample is then rolled six times using a 2 kg steel roller at a speed of 10 m/min in order to fix the bond. The sample is strengthened flush at the top with a stable adhesive strip, which serves as the support for the distance measuring sensor. The sample is then suspended by means of the steel plate so that the longer protruding end of the adhesive tape points vertically downwards.

Measurement:

The sample to be measured is loaded at the bottom end with a weight of 50 g. The steel test plate with the adhesively bonded sample is heated to the final temperature of 200° C., starting at 25° C., at a rate of 9 K/min.

The slip distance of the sample is observed by means of the distance measuring sensor in dependence on the temperature and the time. The maximum slip distance is set at 1000 μm (1 mm); if that value is exceeded, the test is terminated and the failure temperature is noted.

Test atmosphere: room temperature 23+/−3° C., relative humidity 50+/−5%.

EXAMPLES

Characterization of the commercially available chemicals used:

Crosslinker:

Erisys GA 240: N,N,N',N'-tetrakis(2,3-epoxypropyl)-m-xylene-a,a'-diamine Emerald Performance Materials Rubbers:

Block copolymer mixtures based on styrene and butadiene; styrene-butadiene diblock copolymer (SB), styrene-butadiene-styrene triblock copolymer (SBS); styrene-ethylene/butylene-styrene triblock copolymer (SEBS)

Kraton D 1118: diblock/triblock 78/22; polystyrene content approx. 33%; Brookfield viscosity (25° C., 25% in toluene)~0.6 Pa s; triblock linear SBS Kraton D 1102: triblock/diblock 83/17, polystyrene content approx. 29.5%, Brookfield viscosity (25° C., 25% in toluene)~1.2 Pa s; triblock linear SBS Kraton D 1101: triblock/diblock 84/16, polystyrene content approx. 31%, Brookfield viscosity (25° C., 25% in toluene)~4 Pa s; triblock linear SBS Kraton G 1675: triblock/diblock 71/29, polystyrene content approx. 13%, triblock linear SEBS (middle block hydrogenated)

Kraton D 0243 ET: triblock/diblock 25/75, polystyrene content approx. 33% styrene, Brookfield viscosity (25° C., 25% in toluene) 0.3 Pa s.

All Kraton: Kraton Polymers

Resins:

Sylvares® TP95: terpene-phenol resin; softening point approx. 95° C.; $M_w$~900 g/mol; hydroxyl value: 40 mgKOH/g Arizona Dertophene T: terpene-phenol resin, softening point approx. 95° C.; $M_w$~500-800 g/mol; hydroxyl value 20-50 mgKOH/g Dertophene T 110: terpene-phenol resin, softening point approx. 110° C.; $M_w$~500-800 g/mol; hydroxyl value 40-60 mgKOH/g All Dertophene: DRT Unless specifically indicated otherwise, all percentages below are percent by weight. Indicated amounts relating to the adhesive are based on polyacrylate+rubbers+resin=100% by weight, crosslinker (amounts based on 100% by weight polyacrylate) additive to 100 parts by weight adhesive.

Example A

Preparation of the Polyacrylate

A conventional 2-liter glass reactor suitable for radical polymerizations with boiling-cooling was filled with 300 g of a monomer mixture comprising 142.5 g of butyl acrylate, 142.5 g of ethylhexyl acrylate and 15 g of acrylic acid, and 200 g of acetone:special boiling-point spirit 60/95 (1:1). After nitrogen gas had been passed through for 45 minutes, with stirring, the reactor was heated to 58° C. and 0.15 g of 2,2'-azodi(2-methylbutyronitrile) (Vazo 67®, DuPont), dissolved in 6 g of acetone, was added. The external heating bath was then heated to 75° C. and the reaction was carried out constantly at that external temperature. After a reaction time of 1 hour, a further 0.15 g of VAZO 67®, dissolved in 6 g of acetone, was added. After 3 hours, the mixture was diluted with 90 g of special boiling-point spirit 60/95.

After a reaction time of 5½ hours, 0.45 g of bis-(4-tert-butylcyclohexanyl) peroxydicarbonate (Perkadox 16®, Akzo Nobel), dissolved in 9 g of acetone, was added. After a reaction time of 7 hours, a further 0.45 g of bis-(4-tert-butylcyclohexanyl) peroxydicarbonate (Perkadox 16®, Akzo Nobel), dissolved in 9 g of acetone, was added. After a reaction time of 10 hours, the mixture was diluted with 90 g of special boiling-point spirit 60/95. The reaction was terminated after a reaction time of 24 hours and cooled to room temperature.

The at least two-phase adhesive was prepared as follows: A stock solution of the synthetic rubber was first prepared. The solids content was 35% by weight, special boiling-point spirit 60/95:acetone 70:30 was used as the solvent mixture (special boiling-point spirit 60/95 is referred to simply as "spirit" below). The desired amount of stock solution was added to a polyacrylate solution. The desired amount of resin was added to the polyacrylate solution obtained as described above (polyacrylate: 47.5% 2-ethylhexyl acrylate, 47.5% n-butyl acrylate, 5% acrylic acid, Mn=98,000 g/mol, $M_w$=1,100,000 g/mol), and the mixture was diluted with a solvent mixture spirit:acetone 70:30 in such a manner that a final solids content of 35% by weight was obtained and dissolved for 12 hours on a roller bench. Finally, the crosslinker solution (3% by weight in acetone) was added and the mixture was coated on a siliconized release paper by means of a doctor blade on a laboratory coating table. The coatings were then dried at 120° C. for 15 minutes. The adhesive layers with a layer thickness of 46 µm were laminated onto a 12 µm PET film so that a double-sided adhesive tape sample was obtained. The sample was conditioned for one week in a standard atmosphere (23° C., 50% relative humidity).

The acrylate content was 52%, and crosslinking was carried out by means of Erisys GA 240 (0.075%, based on the polyacrylate). Kraton D1118 in an amount of 20% was used as the second polymer component. The resin component used was Sylvares® TP95 in an amount of 28%.

Example B

The procedure was analogous to Example A. The acrylate content was 48%, and crosslinking was carried out by means of Erisys GA 240 (0.075%, based on the polyacrylate). Kraton D1118 in an amount of 20% was used as the second polymer component. The resin component used was Sylvares® TP95 in an amount of 32%.

Example C

The procedure was analogous to Example A. The acrylate content was 44%, and crosslinking was carried out by means of Erisys GA 240 (0.075%, based on the polyacrylate). Kraton D1118 in an amount of 20% was used as the second polymer component. The resin component used was Sylvares® TP95 in an amount of 36%.

Example D

The procedure was analogous to Example A. However, a polyacrylate consisting of 3% acrylic acid, 72% n-butyl acrylate, 15% stearyl acrylate and 10% N-tert-butyl acrylate was used (Mn=72,000 g/mol; $M_w$=1,300,000 g/mol). The acrylate content was 80%, and crosslinking was carried out by means of Erisys GA 240 (0.075%, based on the polyacrylate). Kraton D1118 in an amount of 20% was used as the second polymer component. No adhesive resin was used.

Example E

The procedure was analogous to Example A. However, a polyacrylate consisting of 3% acrylic acid, 67% n-butyl acrylate, 30% 2-ethylhexyl acrylate was used (Mn=64,000 g/mol; $M_w$=1,600,000 g/mol). The acrylate content was 45%, and crosslinking was carried out by means of Erisys GA 240 (0.075%, based on the polyacrylate). Kraton D1118 in an amount of 20% was used as the second polymer component. The resin component used was Dertophene T in an amount of 35%.

Example F

The procedure was analogous to Example A. The acrylate content was 40%, and crosslinking was carried out by means of Erisys GA 240 (0.075%, based on the polyacrylate). Kraton D1118 in an amount of 30% was used as the second polymer component. The resin component used was Sylvares® TP95 in an amount of 30%.

Example G (Comparison)

The procedure was analogous to Example A. The acrylate content was 20%, and crosslinking was carried out by means of Erisys GA 240 (0.075%, based on the polyacrylate). Kraton D1118 in an amount of 50% was used as the second polymer component. The resin component used was Sylvares® TP95 in an amount of 30%.

Example H

The procedure was analogous to Example A. The acrylate content was 60%, and crosslinking was carried out by means of Erisys GA 240 (0.075%, based on the polyacrylate). Kraton D1118 in an amount of 10% was used as the second polymer component. The resin component used was Sylvares® TP95 in an amount of 30%.

Example I

The procedure was analogous to Example A. The acrylate content was 42.5%, and crosslinking was carried out by means of Erisys GA 240 (0.075%, based on the polyacrylate). Kraton D0243 in an amount of 20% was used as the second polymer component. The resin component used was terpene-phenol resin Dertophene T in an amount of 37.5%.

Example J

The procedure was analogous to Example A. The acrylate content was 50%, and crosslinking was carried out by means of Erisys GA 240 (0.075%, based on the polyacrylate). Kraton D1118 in an amount of 10% and Kraton D1102 in an amount of 10% were used as the second polymer component. The resin component used was Dertophene DT110 in an amount of 30%.

Example K

The procedure was analogous to Example A. The acrylate content was 42.5%, and crosslinking was carried out by means of Erisys GA 240 (0.075%, based on the polyacrylate). Kraton D1118 in an amount of 20% was used as the second polymer component. The resin component used was Dertophene T in an amount of 37.5%.

Example L

The procedure was analogous to Example A. The polyacrylate from Example E was used. The acrylate content was 45%, and crosslinking was carried out by means of Erisys GA 240 (0.075%, based on the polyacrylate). Kraton D1118 in an amount of 20% was used as the second polymer component. The resin component used was Sylvares® TP95 in an amount of 35%.

Example M

The procedure was analogous to Example A. The acrylate content was 42.5%, and crosslinking was carried out by means of Erisys GA 240 (0.075%, based on the polyacrylate). Kraton D1101 in an amount of 20% was used as the second polymer component. The resin component used was Dertophene T in an amount of 37.5%.

Example N

The procedure was analogous to Example A. The acrylate content was 42.5%, and crosslinking was carried out by means of Erisys GA 240 (0.075%, based on the polyacrylate). Kraton D1102 in an amount of 20% was used as the second polymer component. The resin component used was Dertophene T in an amount of 37.5%.

Example O

The procedure was analogous to Example A. The acrylate content was 42.5%, and crosslinking was carried out by means of Erisys GA 240 (0.075%, based on the polyacrylate). Kraton G1675 in an amount of 20% was used as the second polymer component. The resin component used was terpene-phenol resin Dertophene T (DRT) in an amount of 37.5%.

Example P (Comparison)

The procedure was analogous to Example A. The acrylate content was 57%, and crosslinking was carried out by means of Erisys GA 240 (0.075%, based on the polyacrylate). Kraton D1118 in an amount of 5% was used as the second polymer component. The resin component used was Sylvares® TP95 in an amount of 38%.

| | Push out force (N) | Ball drop value (cm) | Adhesive power PE (N/cm) | Reworkability | SAFT |
|---|---|---|---|---|---|
| Example A | 170 | >250 | | A/A/A | >200° C. |
| Example B | 173 | >250 | | A/A/A | >200° C. |
| Example C | 191 | 210 | | A/U/U | >200° C. |
| Example D | 112 | >250 | 2.0 | A/A/A | >200° C. |
| Example E | 168 | >250 | 4.8 | A/A/A | >200° C. |
| Example F | | | | | >200° C. |
| Example G (comparison) | | | | | 125° C. |
| Example H | | | | | >200° C. |
| Example I | 145 | 170 | 3.9 | A/A/A | >200° C. |
| Example J | 178 | 210 | | A/A/A | >200° C. |
| Example K | 191 | >250 | 5.4 | A/A/A | >200° C. |
| Example L | 154 | 230 | 4.1 | A/A/A | >200° C. |
| Example M | 135 | 210 | 5.0 | A/A/A | >200° C. |
| Example N | 158 | >250 | 5.1 | A/A/A | >200° C. |
| Example O | 137 | 190 | 3.9 | A/A/A | 185° C. |
| Example P (comparison) | 158 | 90 | jerks | A/U/U | >200° C. |

Figure 1:
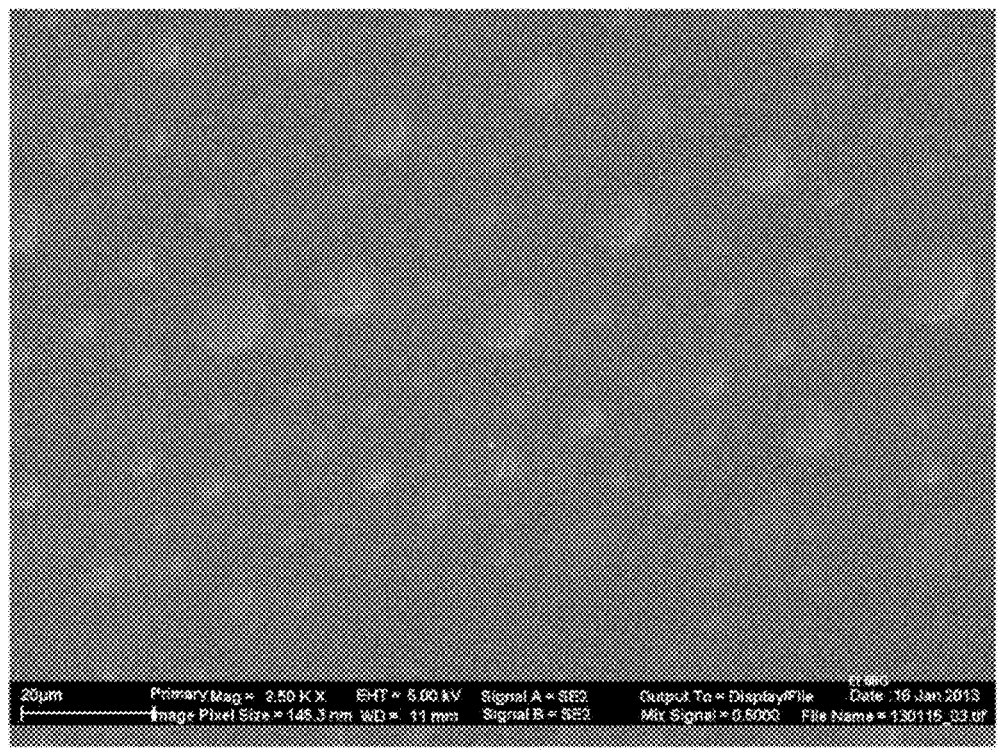
FIG. 1: REM microgram of a sample from Example 1, contrasted with osmium tetroxide. Osmium tetroxide derivatizes olefinic double bonds. Osmium has a significantly higher backscattering capacity for electrons than organic matter. In reflection, osmium-rich regions therefore appear lighter and lower-osmium regions appear darker. The spherical regions can thus be identified as synthetic rubber-rich regions situated in a continuous matrix of polyacrylate. The sample was frozen at −196° C. and a freeze fracture was performed. The image shows the view at the surface.
Figure 2:
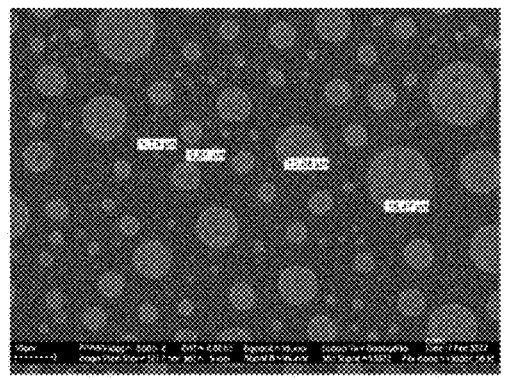
FIG. 2: Surface APe 12.112 from spirit/acetone (Example 1)—magnified 3000 times
Figure 3:
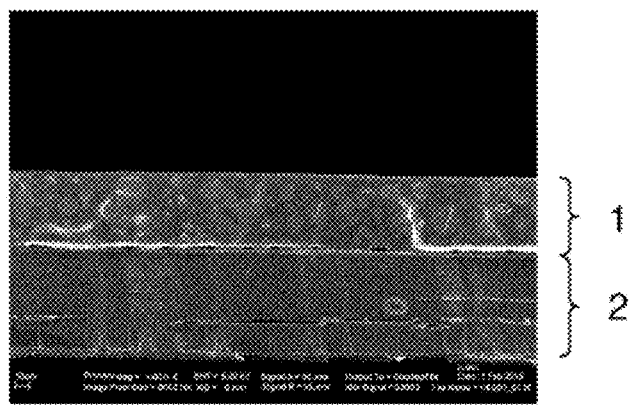
FIG. 3: Broken edge APe 12.112 from spirit/acetone (Example 1)—magnified 1000 times; 1=adhesive layer, 2=polyester backing.

The invention claimed is:

1. A composite of two substrates for use for optical, electronic and/or precision mechanical devices, comprising a first substrate and a second substrate and an adhesive layer arranged to join the first substrate to the second substrate, wherein
the adhesive layer comprises an adhesive comprising a mixture of
(a) a polyacrylate component having a mean molecular weight in the range of from 250,000 g/mol to 10,000,000 g/mol in an amount of from 60% by weight to 90% by weight of the mixture and (b) an elastomer component in an amount of from 10% by weight to 40% by weight of the mixture,
wherein the elastomer component is substantially not miscible with the acrylate component and is dispersed in a continuous matrix of the polyacrylate, so that the adhesive is present in the adhesive layer in at least two separate phases.

2. The composite as claimed in claim 1, wherein one phase forms a matrix and the other phase forms a plurality of domains arranged in the matrix.

3. The composite as claimed in claim 2, wherein the polyacrylate component substantially forms the matrix and the elastomer component substantially represents the domains.

4. The composite as claimed in claim 1, wherein the first substrate and/or the second substrate consists of rigid materials.

5. The composite as claimed in claim 1, wherein the polyacrylate component is formed from acrylic and/or methacrylic monomers, to the extent of at least 50%.

6. The composite as claimed in claim 1, wherein the elastomer component is formed predominantly of one or more synthetic rubbers to the extent of more than 60%.

7. The composite as claimed in claim 6, wherein the synthetic rubbers are selected from the group consisting of thermoplastic block copolymers, the structure of which can be represented by one of the following formulae:

$$A\text{-}B \qquad (II)$$

$$A\text{-}B\text{---}X\text{-}(A'\text{-}B')_n \qquad (IIIa)$$

$$A\text{-}B\text{---}X\text{---}(B'\text{-}A')_n \qquad (IIIb)$$

$$Q_m Y \qquad (IV)$$

wherein
A or A' is a polymer formed by polymerization of a vinyl aromatic compound,
B or B' is a polymer of an isoprene, butadiene or a mixture of butadiene and isoprene or a mixture of butadiene and styrene, or comprising wholly or partially ethylene, propylene, butylene and/or isobutylene, and
X, Y are each an optional linking group,
Q is in each case an arm, bonded to Y, of a multiarm block copolymer, wherein each Q is formed independently by $(A^*\text{-}B^*)_n$, and $A^*$ and $B^*$ are chosen independently of one another according to the above definition of A and B,
n is an integer from 1 to 4,
m is an integer greater than 2.

8. The composite as claimed in claim 1, wherein at least one of the substrates is transparent or translucent.

9. The composite as claimed in claim 1 as a component of an optical, electronic or precision mechanical device.

10. The composite as claimed in claim 9, wherein the transparent or translucent substrate is a window or a lens for the purpose of protecting components arranged therebeneath and/or for effecting physico-optical effects for the functioning of the optical, electronic or precision mechanical device.

11. The composite as claimed in claim 1, wherein the composite is a rigid or flexible display.

12. The composite as claimed in claim 9, wherein the optical, electronic or precision mechanical device is selected from the group consisting of:
cameras, digital cameras, photographic accessories, film cameras, video cameras, digicams, binoculars, night vision devices
computers, laptops, notebooks, netbooks, ultrabooks, tablet computers, devices with touch-sensitive screens, handhelds, electronic diaries and organizers, typewriters, modems, computer accessories, drawing pads, microphones, loudspeakers
reading devices for electronic books
televisions, devices for playing films, video players, monitors, screens, displays, projectors
radios, Walkmans, music players, headphones
printers, fax machines, copiers
telephones, mobile telephones, smart phones, two-way radios, hands-free telephones
defibrillators, blood sugar meters, blood pressure monitors
battery chargers, measuring devices, multimeters, lamps, detectors, optical magnifiers, pocket calculators
remote controls, remote operating devices, games consoles
GPS devices, navigation devices,
devices for summoning people
data storage devices
wristwatches, pocket watches and chain watches.

13. A method for the permanent adhesive bonding of a composite, which comprises bonding said composite with an adhesive layer comprising an adhesive which comprises
(a) a a mixture of a polyacrylate component in an amount of at least 60% by weight of the mixture and
(b) an elastomer component in an amount of not more than 40% by weight of the mixture,
wherein the elastomer component is substantially not miscible with the polyacrylate component so that the adhesive is present in the adhesive layer in at least two separate phases.

14. A method for the permanent adhesive bonding of a first substrate of glass, polymethyl methacrylate or polycarbonate to a second substrate of acrylonitrile-butadiene-styrene copolymer (ABS), polyamide, polycarbonate or of metal which comprises bonding said first substrate to said second substrate with a layer of an adhesive which comprises a mixture of
(c) a polyacrylate component in an amount of at least 60% by weight of the mixture and
(d) an elastomer component in an amount of not more than 40% by weight of the mixture,
wherein the elastomer component is substantially not miscible with the polyacrylate component so that the adhesive is present in the adhesive layer in at least two separate phases.

15. A method for the permanent adhesive bonding of a first substrate of glass, polymethyl methacrylate or polycarbonate to a second substrate of acrylonitrile-butadiene-styrene copolymer (ABS), polyamide, polycarbonate or of metal, which comprises bonding said first substrate to said second substrate with a layer of an adhesive which comprises a mixture of
- (e) a polyacrylate component in an amount of at least 60% by weight of the mixture and
- (f) an elastomer component in an amount of not more than 40% by weight of the mixture, wherein the elastomer component is substantially not miscible with the polyacrylate component so that the adhesive is present in the adhesive layer in at least two separate phases.

16. The method of claim 14 wherein the second substrate is surface modified.

* * * * *